(12) United States Patent
Scolari et al.

(10) Patent No.: US 8,695,320 B2
(45) Date of Patent: Apr. 15, 2014

(54) NON-BACK-BENDING CHAIN

(75) Inventors: Nathan A. Scolari, Greenville, SC (US); George Reiter, Taylors, SC (US)

(73) Assignee: Zike, LLC, Greenville, SC (US)

( * ) Notice: Subject to any disclaimer, the term of this patent is extended or adjusted under 35 U.S.C. 154(b) by 92 days.

(21) Appl. No.: 13/366,646

(22) Filed: Feb. 6, 2012

(65) Prior Publication Data
US 2012/0198809 A1     Aug. 9, 2012

Related U.S. Application Data

(60) Provisional application No. 61/439,590, filed on Feb. 4, 2011, provisional application No. 61/439,603, filed on Feb. 4, 2011.

(51) Int. Cl.
*F16G 13/20*       (2006.01)

(52) U.S. Cl.
USPC .......... 59/78; 59/78.1; 59/84; 59/93; 474/206; 474/212; 198/784

(58) Field of Classification Search
USPC ............... 59/78.1, 84, 93, 900; 474/206, 212; 198/784
See application file for complete search history.

(56) References Cited

U.S. PATENT DOCUMENTS

| | | | | |
|---|---|---|---|---|
| 3,994,373 | A * | 11/1976 | Loos et al. | 59/78.1 |
| 4,941,316 | A * | 7/1990 | Bechtold | 59/78 |
| 5,970,701 | A * | 10/1999 | Roden et al. | 59/78 |
| 6,952,916 | B1 * | 10/2005 | Fountaine | 59/78.1 |
| 8,250,846 | B2 * | 8/2012 | Soerensen | 59/78 |
| 8,336,286 | B2 * | 12/2012 | Veltrop et al. | 59/78 |
| 2009/0008615 | A1 * | 1/2009 | Young et al. | 254/133 R |

* cited by examiner

*Primary Examiner* — David B Jones
(74) *Attorney, Agent, or Firm* — McNair Law Firm, P.A.; Douglas W. Kim

(57) ABSTRACT

A non-back-bending chain having a plurality of links wherein said links include a rounded portion, a right flat portion, a bottom portion, and a left flat portion. The rounded portion allows the chain to bend or coil in one direction. The flat portions, when in contact, prevent the chain from bending in the opposite direction. Therefore, a chain that can be used to both "push" and "pull" is provided. Further, the chain can be used to provide a rigid extension that can be used to support a force even when only supported by one end. The chain can be retracted for storage and bunched or coiled.

16 Claims, 9 Drawing Sheets

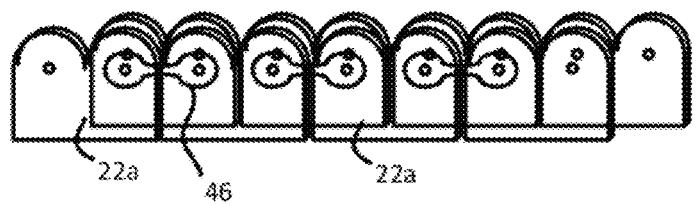
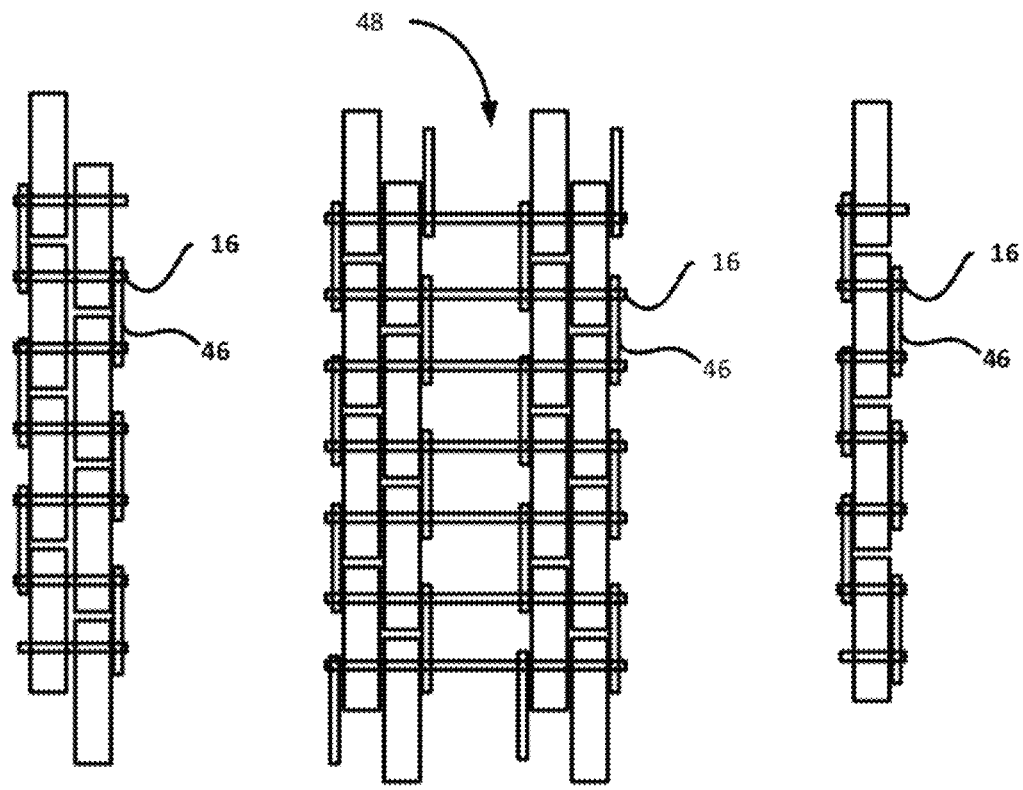
Fig 3B  Fig 3C  Fig 3D

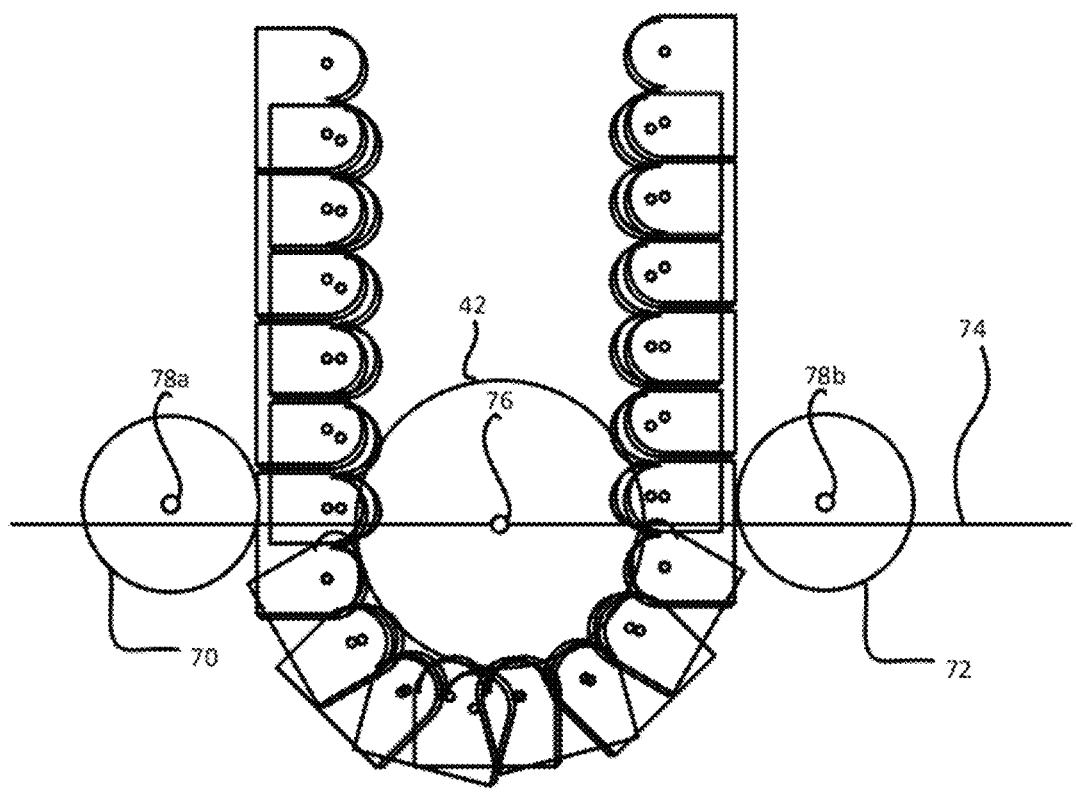

NON-BACK-BENDING CHAIN

CLAIM OF PRIORITY

This application claims priority on U.S. Provisional Patent Application Ser. No. 61/439,590 filed Feb. 4, 2011 and U.S. Provisional Patent Application Ser. No. 61/439,603 filed Feb. 4, 2011.

FIELD OF THE INVENTION

This invention is directed to a non-back-bending chain that will flex in one direction, but will remain rigid in the opposite direction.

BACKGROUND OF THE INVENTION

Chains are well-known in the art and are used for multiple applications. However, the traditional construction of the chain only allows for the chain to be pulled, not pushed. The same design allowing a chain to bend or curve around a radius prevents the chain from being "pushed". If a traditional chain is pushed, the chain would buckle disadvantageously without transferring the force in the direction of the push. Further, the chain would disengage any sprocket that it was driving as it buckled.

Further, for a chain to extend in a linear fashion, two ends of the chain need to be supported. As such, a chain cannot provide a rigid support or extension being only supported at one end.

Therefore, it is an object of the present invention to provide a chain that is non-back-bending, can provide a rigid support even when only being supported at one end and can transfer force to one end when being pushed by the other end.

SUMMARY OF THE INVENTION

Accordingly, the object of the present invention is accomplished by providing a non-back-bending chain having a plurality of links where each link has a rounded portion, a bottom portion, a left portion, and a right portion. A plurality of pins and/or attachment members can pivotably connect the links.

DESCRIPTION OF THE DRAWINGS

The invention will be more readily understood with the following drawings incorporated into the specification.

FIG. 3A is a perspective view of one embodiment of the invention;

FIGS. 3B through 3D are top views of the invention;

FIG. 5 is a perspective view of an embodiment of the invention including a chain wrapped around a gear in conjunction with first and second idlers;

DESCRIPTION OF A PREFERRED EMBODIMENT

Referring now in more detail to the drawings, the invention will now be described in more detail.

Figure 1A:
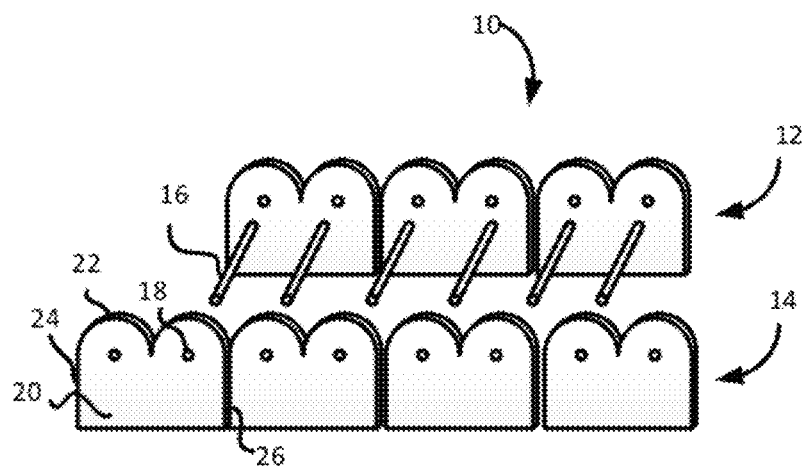
FIG. 1A is an exploded view of one embodiment of the invention.

Referring now to FIG. 1A, a chain 10 is shown in an exploded view having a first set of links 12 and a second set of links 14, arranged in an offset configuration. Connection pins 16 are received by openings 18 in each link 20 pivotably connecting the first and second set of links. Each link has a rounded portion 22, a left flat portion 24, and a right flat portion 26.

Figure 1B:
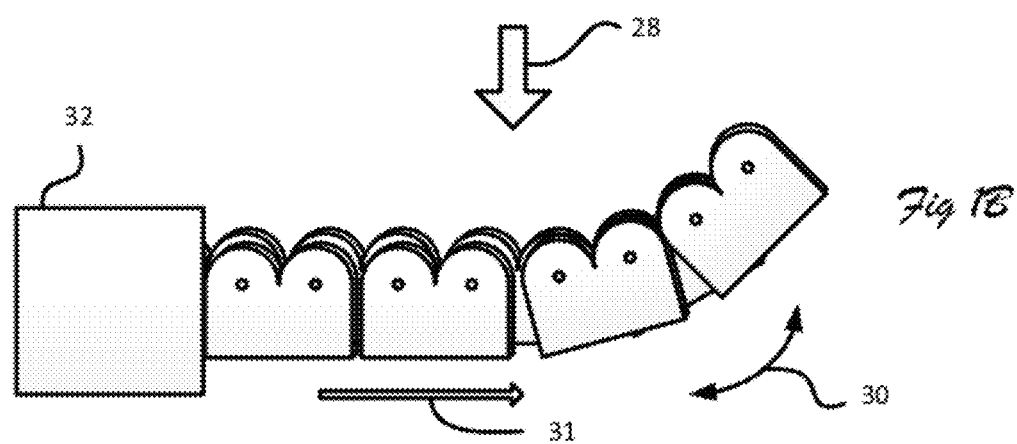
FIGS. 1B and 1C are perspective views of one embodiment of the invention.

Referring now to FIG. 1B, the configuration shown as A illustrates that when a force 28 is placed on the chain, on the rounded portion side, the links of the chain are allowed to rotate in direction 30. Therefore, the chain will bow downward in response to force 28. Force 28 can be force applied from above the chain or from below such as gravity. Edge 26 and edge 24 of adjacent links are allowed to separate due to the rotation caused by force 28.

Figure 1C:
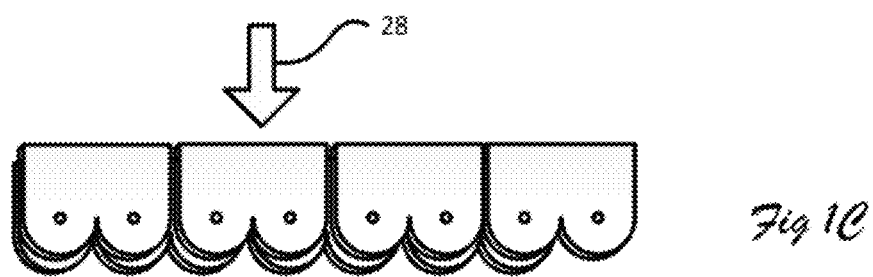

When the chain is inverted in the configuration shown in FIG. 1C, force 28 applied will cause edges of adjacent links to come in contact and prevent the chain from bowing, thereby supporting force 28.

Figure 2A:
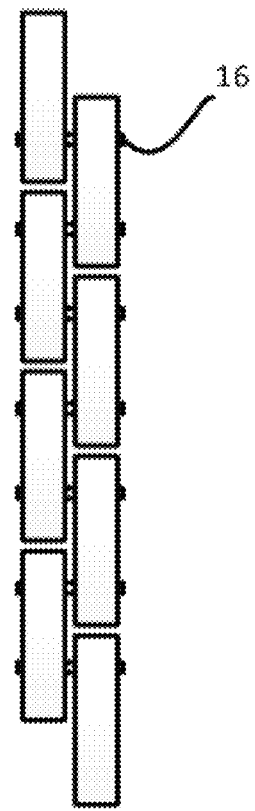
FIGS. 2A and 2B are top views of several embodiments of the invention.

Referring to FIG. 2A, one embodiment shows the first set of links and the second set of links offset with the links pivotably connected with pins 16. This configuration allows for a support to be extended from a base 32 providing for a chain that will not bow or backbend even when only supported at one end.

Figure 2B:
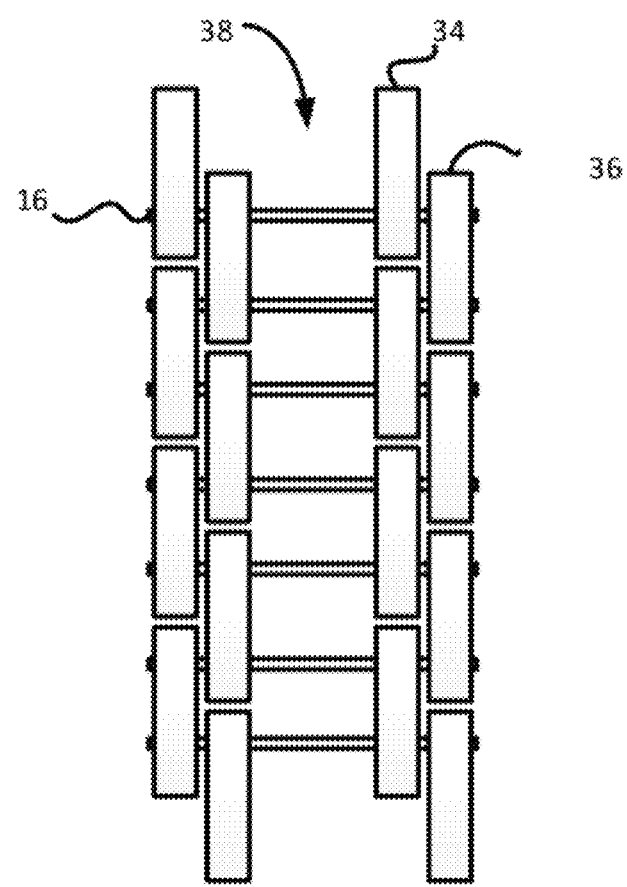
Figure 2C:
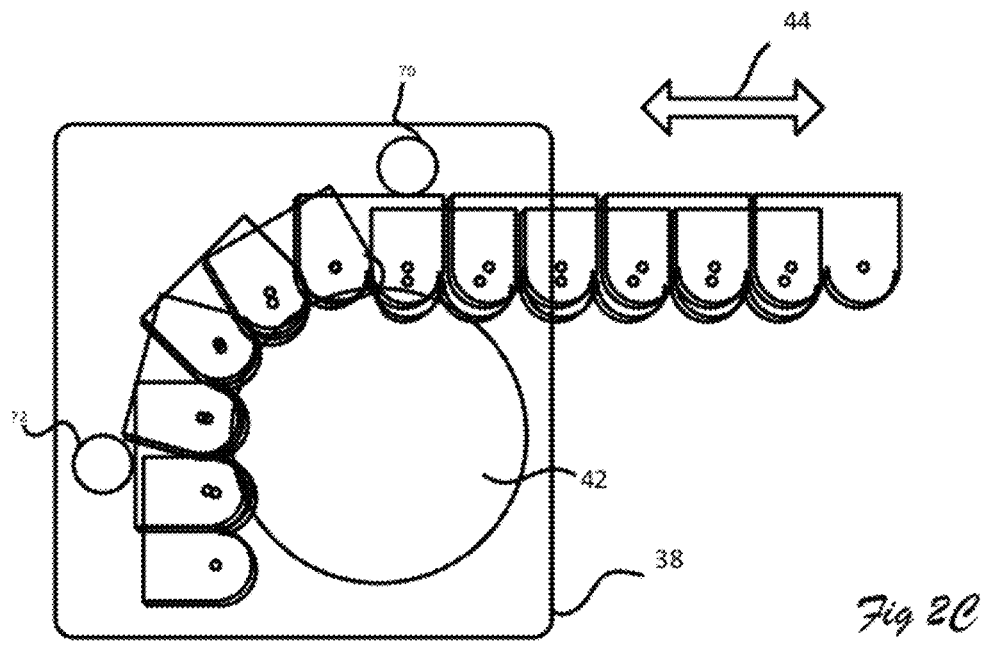
FIGS. 2C and 2D are perspective views of one embodiment of the invention.
Figure 2D:
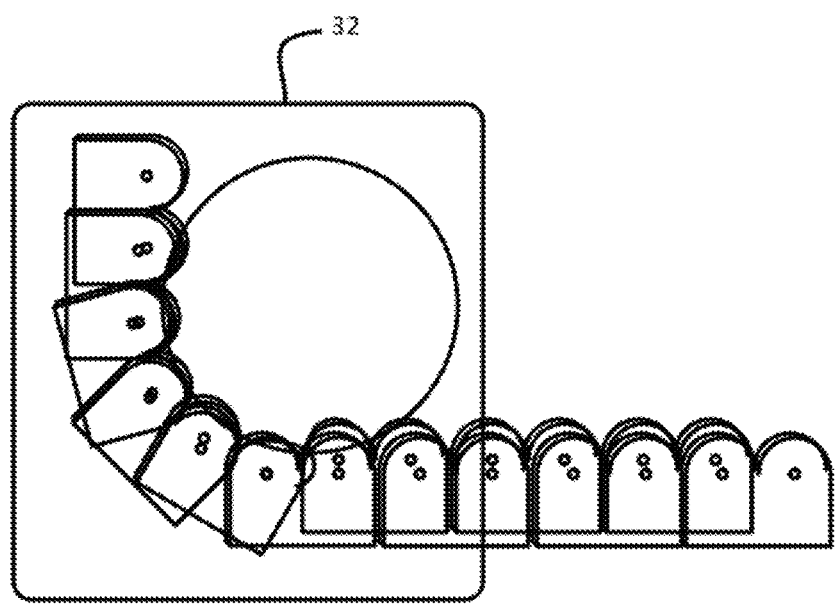

Referring to FIGS. 2B and 2C, another embodiment of a chain is shown. In this embodiment, the first and second set of links, configured in an offset arrangement, are connected to a third set of links 34 and fourth set of links 36 to define a space 38. The first, second, third, and fourth set of links are connected by pins 16. This embodiment allows a sprocket 42 to engage the pins and drive the chain in a direction shown as 44 as shown in FIG. 2C. Further, the sprocket will allow the chain to be coiled or gathered inside a housing 32, or around a spool so that the chain is easily stored when retracted, but provides a linear support surface when extended. The chain can be used as shown or inverted as shown in FIG. 2D.

It should be noted that the arrangement shown in FIG. 2C will tend to bend downwards due to gravity, but will still exert both a push and pull force in direction 44. The arrangement shown in FIG. 2D will not bend downwards due to the specific construction of the links while still able to apply force in direction 44, even when only supported at one end.

Referring to FIGS. 3A through 3C, links 22a and 22b can be pivotably connected by attachment member 46. The attachment member 44, and offset corresponding attachment member, can be connected by pin 16. Repeating this configuration results in a chain having space 48 for receiving a sprocket.

Referring to FIG. 3D, a single set of links is shown having links 22a and 22b connected with attachment members 44.

Referring to FIG. 3D, a single set of links is shown having links 22a and 22b connected with attachment members 44.

Figure 4A:
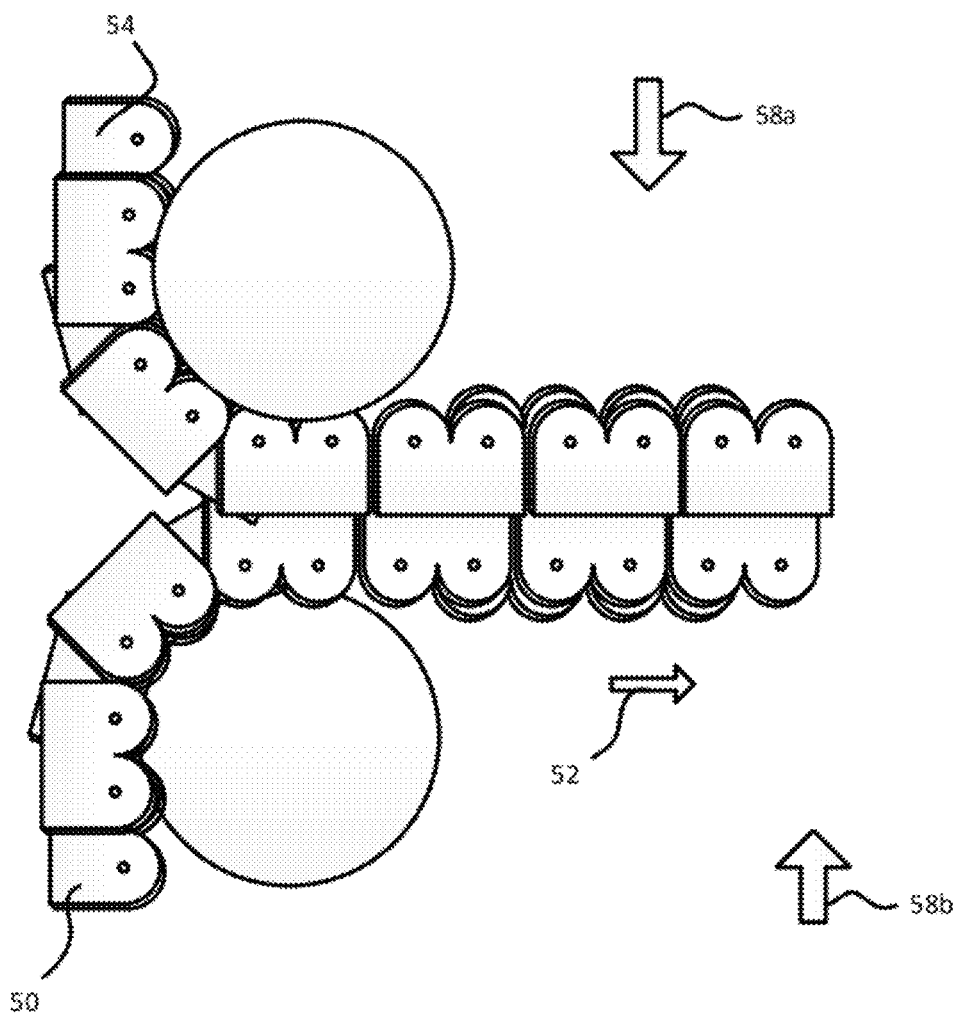
FIG. 4A is a perspective view of one embodiment of the invention.
Figure 4B:
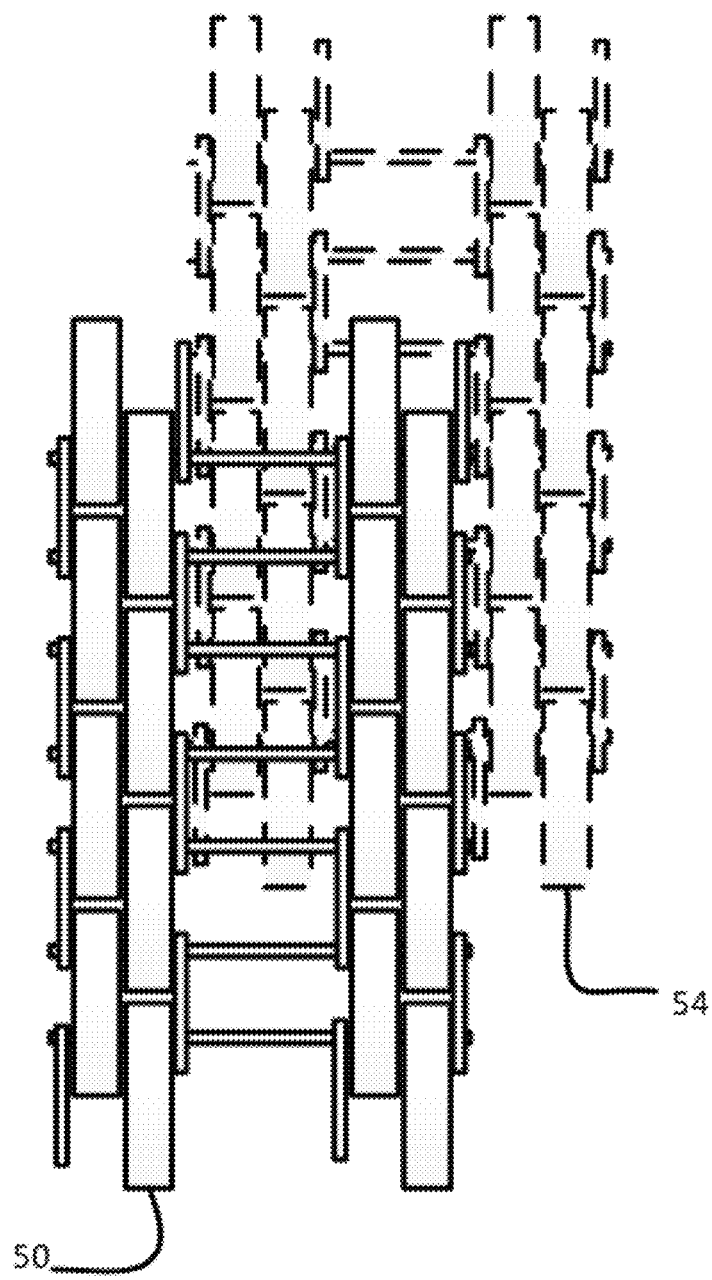
FIG. 4B is a top view of one embodiment of the invention.

Referring to FIGS. 4A and 4B, two chains are combined to provide an extendable arm supported at one end. In this configuration, a first chain 50 is extended in a direction 52. A second chain 54 is also extended in direction 52 and in an inverted orientation to chain 50. Bottom side of chain 54 is received in the space of chain 50 so that the bottom sides of the two chains overlap. Therefore, forces 58*a* or 58*b* will not cause the chain combination to bend. When retracted, the chains can wrap around a spool or other gathering device for storage.

Further, the chain can be coiled within the base for storage and extended in a direction 31 when needed to provide a support surface or to apply force in direction 31.

Referring to FIG. 5, one embodiment is shown having first idler 70 and second idler 72. The enter portion of the idlers (the rotational axis) should be slighting above the rotations axis of gear 42 to assist in guiding the chain about the gear. As shown planar indicator 74 is aligned with the rotational axis 76 of gear 42. The rotational axis of the idlers 78*a* and 78*b* are disposed above the planar indicator. This positing, in one embodiment, has the idles arranged where the axis of the idlers are ½ the teeth height distance of gear 42 above the planar indicator 74.

Figure 6:
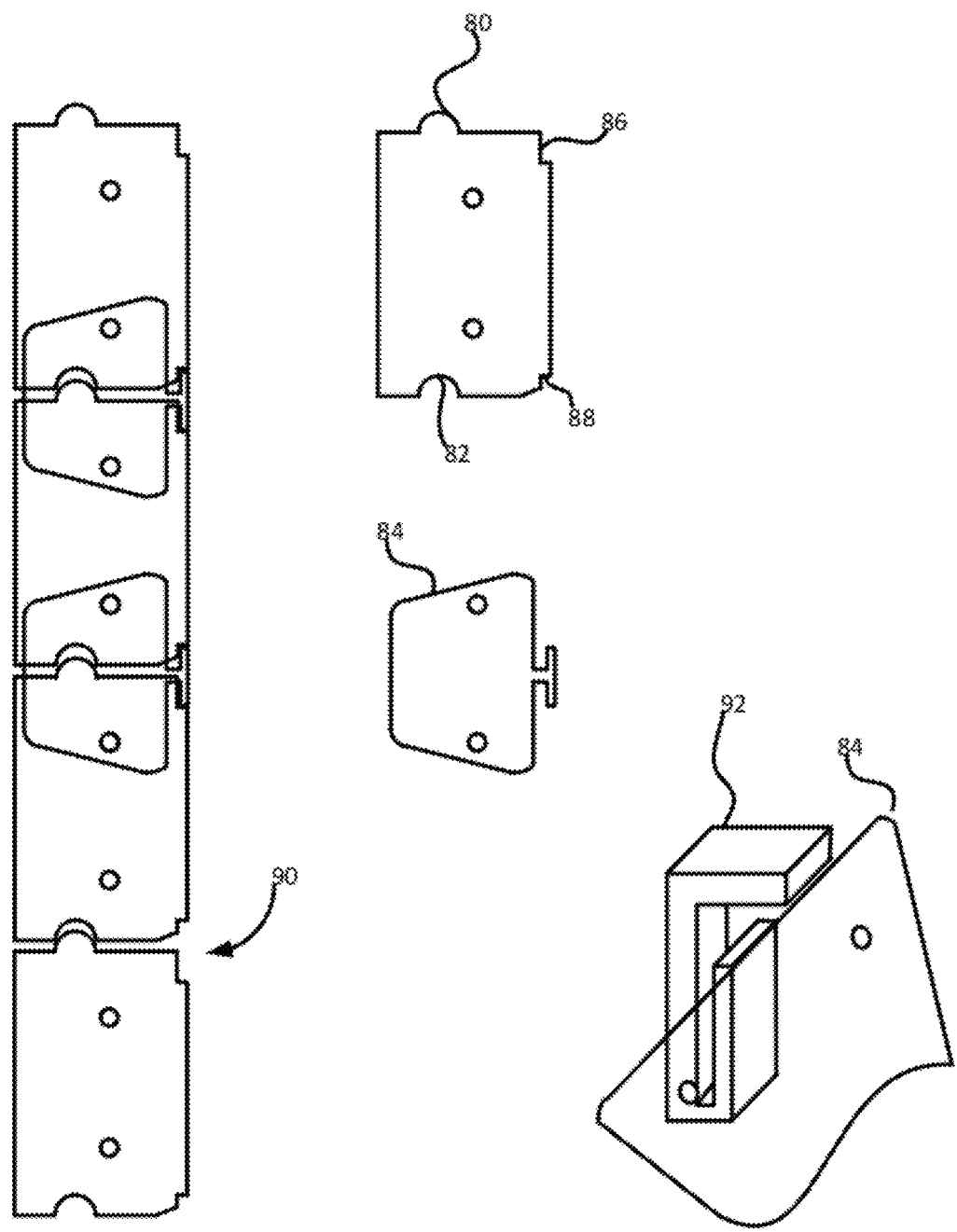
FIG. 6 is a perspective view of an embodiment of the invention including a tab and a tab recess on the links.

Referring to FIG. 6, one embodiment is shown. In this embodiment, the links of the chain include a tab 80 on one side of the link and a tab recess 82 defined in the opposite of the link. When the links are connected by interior link 84, the tab of one link can be received in the recess of the adjacent link which assist in causing the links to form a rigid structure. The link can have a first cutaway 86 and a second cutaway 88 in the top of the link. When the links are adjacent, the two cutaways form a locking plate recess 90.

A locking plate 92 can be attached to the inner link and can be biased to a forward position so that when two links are interlocked, the locking plate is received into the locking plate recess thereby securing the two links together and preventing the two links from bending. When the locking plate is removed from the locking plate recess, the links can then rotate about the openings 18. As the links rotate about a gear, sprocket or idler, the tab can be moved away from the links allowing the links to rotate about the openings.

Figure 7:
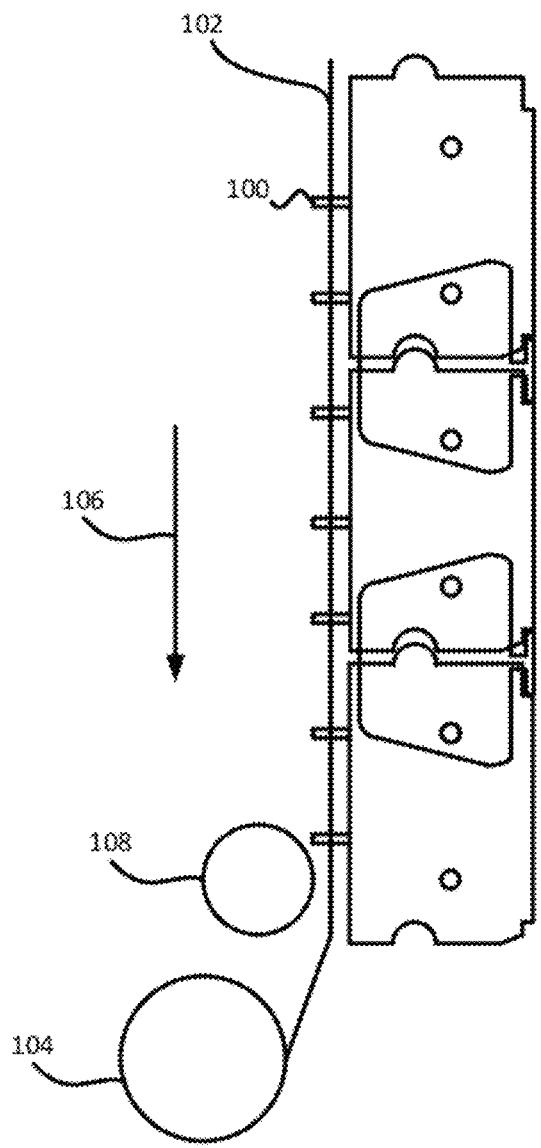
FIG. 7 is a perspective view of an embodiment of the invention having pins on the bottom of the links for engaging holes in a band.

Referring to FIG. 7, the links of the chain are arranged in a vertical orientation. Each link includes an engagement pin 100 disposed on the bottom of the link. These engagement pins are received in openings in a band 102 as described in U.S. Patent Application Ser. No. 61/439,603. The band is collected by a spooler 104 when the links are traveling in a direction shown as 106. This configuration prevents the links from rotating in a direction of the band and adds support to the chain. The invention can also include an idler 108 disposed adjacent to the band on the opposite side of the band as the chain.

While the invention has been described with reference to certain exemplary embodiments, obvious modifications and alterations are possible by those skilled in the related art. Therefore, it is intended that the invention include all such modifications and alterations to the full extent that they come within the scope of the following claims or the equivalents thereof.

What is claimed is:

1. A non-back-bending chain comprising:
a plurality of links pivotably connected to each other;
a tab included in each of said links;
a tab recess included in each of said links so that when links are adjacent and in an interlocked position, said tab of the adjacent link is received in the tab recess and when said links are rotated away from an interlocked position, the tab is removed from said tab recess allowing the chain to bend;
a plurality of pins pivotably connecting said links so that said chain will bend in a direction toward a top edge, but will not bend past a predetermined point in the opposite direction;
a plurality of inner link pivotably connected to said links;
a locking plate carried by each of said inner links; and,
a first cutaway defined in an adjacent link and a second cutaway defined in a link so that when said links are in said interlocked position, said first and second cutaway define a locking plate recess for receiving said locking plate to interlock said links.

2. The chain of claim 1 including:
a plurality of engagement pins attached on the bottom of each of said links;
a band having plurality of openings for receiving said engagement pins;
a spooler for wrapping said band when said chain is in a retracted position and releasing said band from said spooler when said chain is in an extended position; and,
whereas said band causes said chain to be in said interlocked position.

3. The chain of claim 1 including a first set of links pivotably connected to a second set of links in an offset configuration.

4. The chain of claim 1 including a space between two sets of offset links for receiving a sprocket.

5. The chain of claim 1 including a housing having a sprocket for extending and retracting said chain into and out of said housing.

6. The chain of claim 5 including:
a spooler contained in said housing;
a plurality of engagement pins attached to said links; and,
a band carried by said spooler and having an opening for receiving said pins.

7. The chain of claim 1 including:
a rounded portion included in each link of said chain; and,
a second chain arranged in a nested configuration so that said rounded portion of each of said links of said chain abuts said pins of said adjoining chain.

8. A non-back-bending chain comprising:
a plurality of external links pivotably connected to a plurality of inner links;
a tab included in each of said external links;
a tab recess included in each of said external links so that when links are adjacent and in an interlocked position, said tab of the adjacent external link is received in the tab recess and when said external links are rotated away from an interlocked position, the tab is removed from said tab recess allowing the chain to bend;
a plurality of pins pivotably connecting said external and said inner links so that said chain will bend in a direction toward a top edge, but will not bend past a predetermined point in the opposite direction;
a locking plate carried by each of said inner links;
a first cutaway defined in an adjacent external link and a second cutaway defined in an external link so that when said external links are in said interlocked position, said first and second cutaway define a locking plate recess for receiving said locking plate to interlock said external links.

9. The chain of claim 8 including:
a plurality of engagement pins attached on the bottom of each said external links;
a band having plurality of openings for receiving said pins;
a spooler for wrapping said band when said chain is in a retracted position and releasing said band from said spooler when said chain is in an extended position;

whereas said band causes said chain to be in said interlocked position.

10. The chain of claim 8 including a first set of external and inner links pivotably connected to a second set of external and inner links in an offset configuration.

11. The chain of claim 1 including a space between two sets of external and inner links for receiving a sprocket.

12. The chain of claim 1 including a housing having a sprocket for extending and retracting said chain into and out of said housing.

13. A non-back-bending chain comprising:
- a plurality of external links pivotably connected to a plurality of inner links;
- a tab included in each of said external links;
- a tab recess included in each of said external links so that when links are adjacent and in an interlocked position, said tab of the adjacent external link is received in the tab recess and when said external links are rotated away from an interlocked position, the tab is removed from said tab recess allowing the chain to bend;
- a plurality of pins pivotably connecting said external and said inner links so that said chain will bend in a direction toward a top edge, but will not bend past a predetermined point in the opposite direction;
- a locking plate carried by each of said inner links;
- a first cutaway defined in an adjacent external link and a second cutaway defined in an external link so that when said external links are in said interlocked position, said first and second cutaway define a locking plate recess for receiving said locking plate to interlock said external links;
- a plurality of engagement pins attached on the bottom of each of said external links;
- a band having plurality of openings for receiving said engagement pins;
- a spooler for wrapping said band when said chain is in a retracted position and releasing said band from said spooler when said chain is in an extended position;
- whereas said band causes said chain to be in said interlocked position.

14. The chain of claim 13 including a first set of external and inner links pivotably connected to a second set of external and inner links in an offset configuration.

15. The chain of claim 13 including a space between two sets of external and inner links for receiving a sprocket.

16. The chain of claim 13 including a housing having a sprocket for extending and retracting said chain into and out of said housing.

* * * * *